(12) United States Patent
Jansen et al.

(10) Patent No.: US 9,461,749 B2
(45) Date of Patent: Oct. 4, 2016

(54) OPTICAL LINE TERMINAL TRANSMITTING DEVICE FOR NEXT GENERATION OPTICAL ACCESS NETWORKS

(75) Inventors: Sander Jansen, Germering (DE); Harald Rohde, Munich (DE)

(73) Assignee: Xieon Networks S.a.r.l., Luxembourg (LU)

( * ) Notice: Subject to any disclaimer, the term of this patent is extended or adjusted under 35 U.S.C. 154(b) by 0 days.

(21) Appl. No.: 14/127,044

(22) PCT Filed: Jun. 19, 2012

(86) PCT No.: PCT/EP2012/061747
§ 371 (c)(1),
(2), (4) Date: Apr. 23, 2014

(87) PCT Pub. No.: WO2013/000770
PCT Pub. Date: Jan. 3, 2013

(65) Prior Publication Data
US 2014/0226993 A1 Aug. 14, 2014

(30) Foreign Application Priority Data
Jun. 30, 2011 (EP) .................... 11172272

(51) Int. Cl.
*H04B 10/04* (2006.01)
*H04B 10/50* (2013.01)
*H04B 10/272* (2013.01)

(52) U.S. Cl.
CPC ........ *H04B 10/5053* (2013.01); *H04B 10/272* (2013.01); *H04B 10/505* (2013.01)

(58) Field of Classification Search
CPC .. H04B 10/505; H04B 10/504; H04B 10/58; H04B 10/50; H04B 10/502; H04B 10/5053; H04B 10/272; H04B 10/55053; H04B 10/548; H04J 14/0206; H04J 14/0212; H04J 14/022; H04J 14/0257; H04J 14/0298; H04J 13/004; H04L 27/2601; H04L 5/023
USPC ....... 398/182–185, 188, 195, 196, 192, 194, 398/200
See application file for complete search history.

(56) References Cited

U.S. PATENT DOCUMENTS 6,614,567 B1 * 9/2003 Al-Salameh ............ H04J 14/02
398/79
8,639,120 B2 * 1/2014 Kim ..................... H04B 10/505
398/149

(Continued)

FOREIGN PATENT DOCUMENTS

| EP | 2073474 A1 | 6/2009 |
| WO | 2013/000770 A1 | 1/2013 |

OTHER PUBLICATIONS

Taniguchi, T. et al., "Heterodyne detection of wavelength-swept super-dense WDM signal employing spectrum shaping," Electronics Letters, vol. 45(17):902-903 (2009).

(Continued)

*Primary Examiner* — Hibret Woldekidan
(74) *Attorney, Agent, or Firm* — Nelson Mullins Riley & Scarborough LLP

(57) ABSTRACT

An Optical Line Terminal (OLT) transmitting device is provided, the device comprising an IQ modulator having a first input, a second input and an output, a first digital analog converter (DAC) directly coupled to the first input of the IQ modulator, a second digital analog converter (DAC) directly coupled to the second input of the IQ modulator; an optical filter directly coupled to the output of the IQ modulator.

5 Claims, 3 Drawing Sheets

(56) References Cited

U.S. PATENT DOCUMENTS

| | | | | |
|---|---|---|---|---|
| 8,787,767 | B2* | 7/2014 | Wilkinson | H04B 10/548 398/140 |
| 8,842,997 | B2* | 9/2014 | Liu | H04B 10/5053 398/182 |
| 9,008,512 | B2* | 4/2015 | Nazarathy | H04B 10/272 398/65 |
| 2004/0213303 | A1* | 10/2004 | Litvin | G01J 3/1895 372/28 |
| 2004/0246994 | A1* | 12/2004 | Munoz | H03H 17/0266 370/484 |
| 2005/0271387 | A1* | 12/2005 | Kee | H04B 10/2543 398/140 |
| 2007/0024856 | A1* | 2/2007 | Izatt | A61B 3/102 356/456 |
| 2009/0238580 | A1* | 9/2009 | Kikuchi | H04B 10/25137 398/192 |
| 2012/0224866 | A1* | 9/2012 | Gaete | H04L 27/2096 398/186 |
| 2012/0321311 | A1* | 12/2012 | Zhang | H04J 14/06 398/65 |

OTHER PUBLICATIONS

International Search Report and Written Opinion for Application No. PCT/EP2012/061747, 11 pages, dated Oct. 30, 2012.

* cited by examiner

OPTICAL LINE TERMINAL TRANSMITTING DEVICE FOR NEXT GENERATION OPTICAL ACCESS NETWORKS

RELATED APPLICATIONS

This application is a 35 U.S.C. 371 national stage filing of International Application No. PCT/EP2012/061747, filed on Jun. 19, 2012, which claims priority to and benefit of European Patent Application No. 11172272.4, filed Jun. 30, 2011, the contents of each of which are hereby incorporated by reference herein.

FIELD OF THE INVENTION

The invention relates to devices for optical communication networks. In particular, the invention relates to a Optical Line Terminal (OLT) transmitting device for Next Generation Optical Access networks.

BACKGROUND OF THE INVENTION

Recently, a lot of effort and energy is put into designing next generation optical access (NGOA) networks that can alleviate the data rate bottleneck that is present in current access networks. Many different next generation optical access (NGOA) networks architectures have been proposed. A very promising architecture has been recently been proposed in H. Rohde "Next Generation Optical Access: 1 Gbit/s for everyone", invited talk at ECOC 2009.

Coherent detection is a key factor to enable the key parameters: 1 Gbit/s sustained symmetrical data rate per user, up to 100 km reach and a splitting factor of up to 1000.

FIG. 1 is a schematic representation of a high level architecture of a next generation optical access (NGOA) network.

FIG. 2 is a schematic representation of possible DAC based realization of an OLT transmitter and the optical spectrum at the output.

The data that is to be sent is first pre-processed by a DSP unit and digitally up-converted to intermediate frequencies. Subsequently the real and imaginary part are separated and fed to two DACs.

The outputs of the DACs are then used to modulate the complex signal on an optical carrier using an IQ modulator. On the right side of FIG. 2 the optical spectrum of the transmitter output is shown. In this illustration 3 subcarriers are shown.

In between the subcarriers a guardband is present in order to allow the signal from the ONU to be sent back to the OLT on the same fiber without being impaired by back-reflections. The spectral guardband that is required is at least as wide as the bandwidth of the subcarriers itself and this means that for the DACs less then half of the bandwidth can be used effectively for the generation of subcarriers.

The main disadvantage of this implementation is that the guardband required in between the subcarriers reduces the efficiency of the DAC (the number of subcarriers that can be generated with a single OLT).

In conventional DAC based realization of OLT transmitters, DAC are used in association with guardbands between the subcarriers, which may result in an inefficient use of the DACs Alternatively analogue electrical IQ mixers could be used to up-convert all individual subcarriers. However, these analogue components are relatively expensive.

The problem to be solved is to overcome the disadvantages stated above and in particular to provide a solution which allows increasing the efficiency of an OLT transmitter in a cost effective way.

SUMMARY OF THE INVENTION

In order to overcome the above-described need in the art, the present invention discloses an Optical Line Terminal (OLT) transmitting device comprising an IQ modulator having a first input, a second input and an output, a first digital analog converter (DAC) directly coupled to the first input of the IQ modulator, a second digital analog converter (DAC) directly coupled to the second input of the IQ modulator; an optical filter directly coupled to the output of the IQ modulator.

In a next embodiment, the optical filter is a periodic filter.

In a further embodiment, the IQ modulator has a third input, and the tunable laser is directly coupled to the third input of the IQ modulator.

It is also an embodiment that the tunable laser is configured to be tuned with the optical filter.

In a next embodiment of the invention, the optical filter is configured to drift so that it can lock with the tunable laser.

The device provided, in particular, bears the following advantages:

a) It allows increasing the efficiency of an OLT transmitter.
b) It has relatively broad applications and it can be easy implemented.
c) It effectively reduces the effective cost of the OLT per signal generated, since each DAC can generate more signals.

BRIEF DESCRIPTION OF THE DRAWINGS

The invention is explained by way of example in more detail below with the aid of the attached drawings.

DESCRIPTION OF THE INVENTION

Illustrative embodiments will now be described with reference to the accompanying drawings to disclose the teachings of the present invention. While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
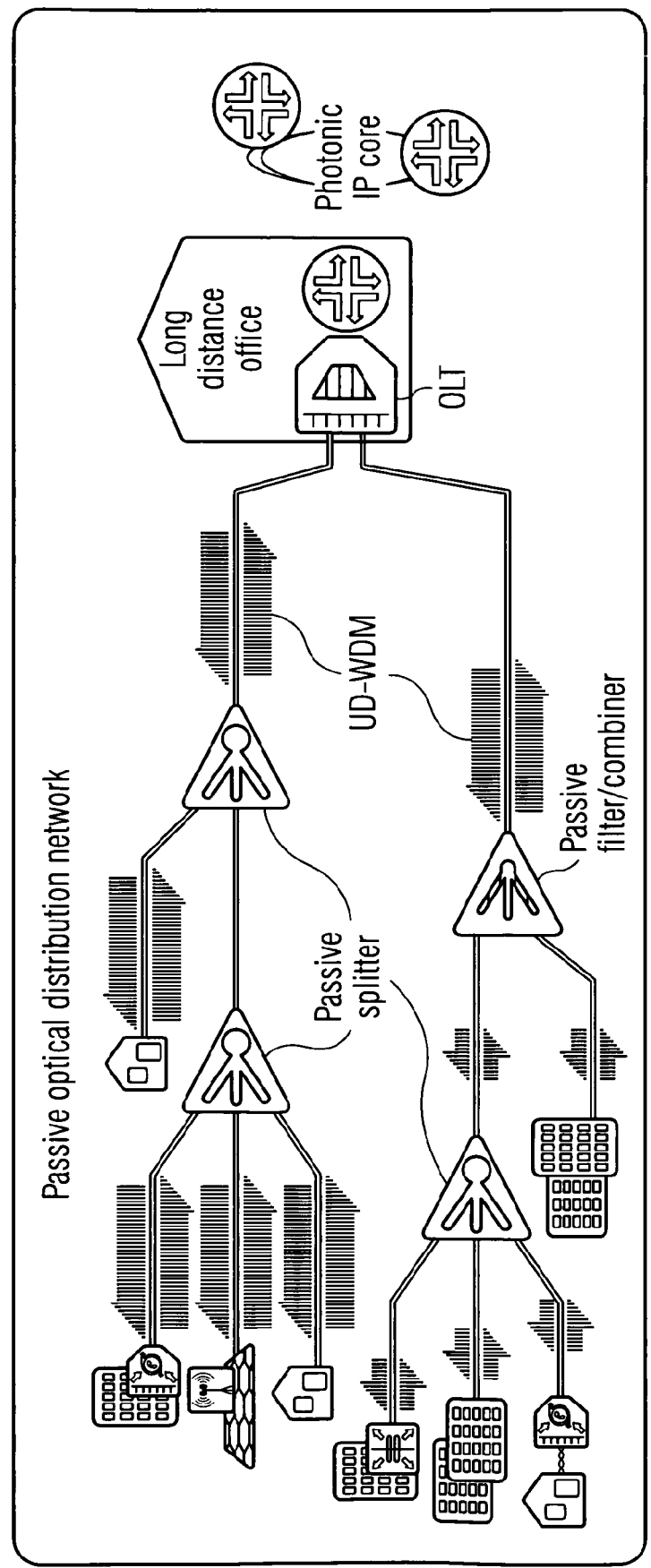
FIG. 1 is a schematic representation of a high level architecture of a next generation optical access (NGOA) network.
Figure 2:
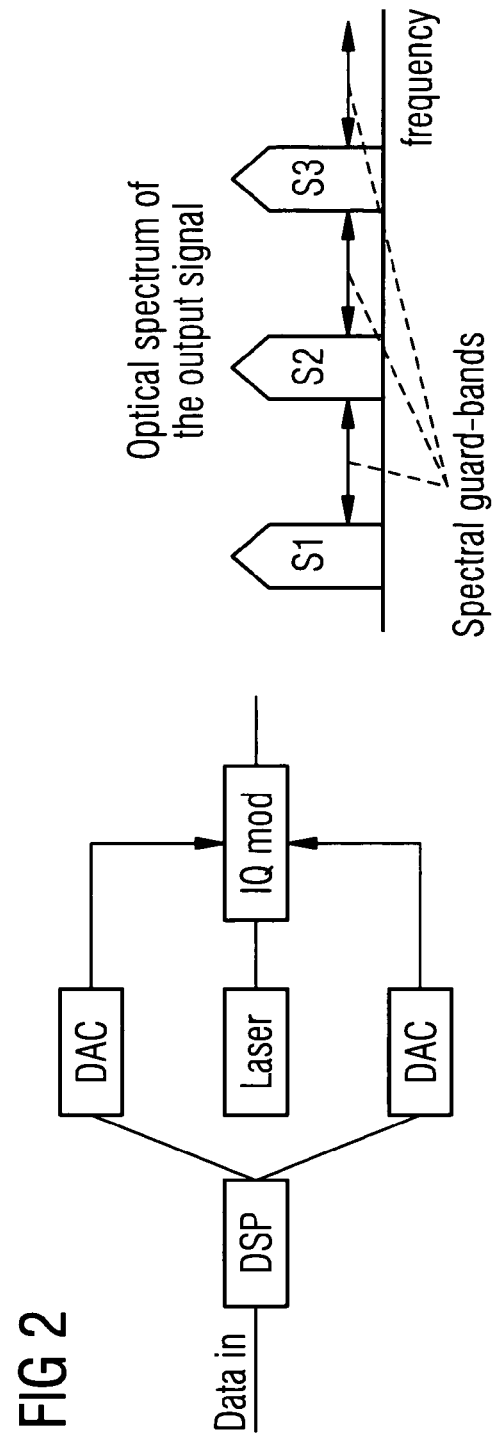
FIG. 2 is a schematic representation of possible DAC based realization of an OLT transmitter and the optical spectrum at the output.

As regards the description of FIGS. 1 and 2, reference is made to the background of the invention.

Figure 3:
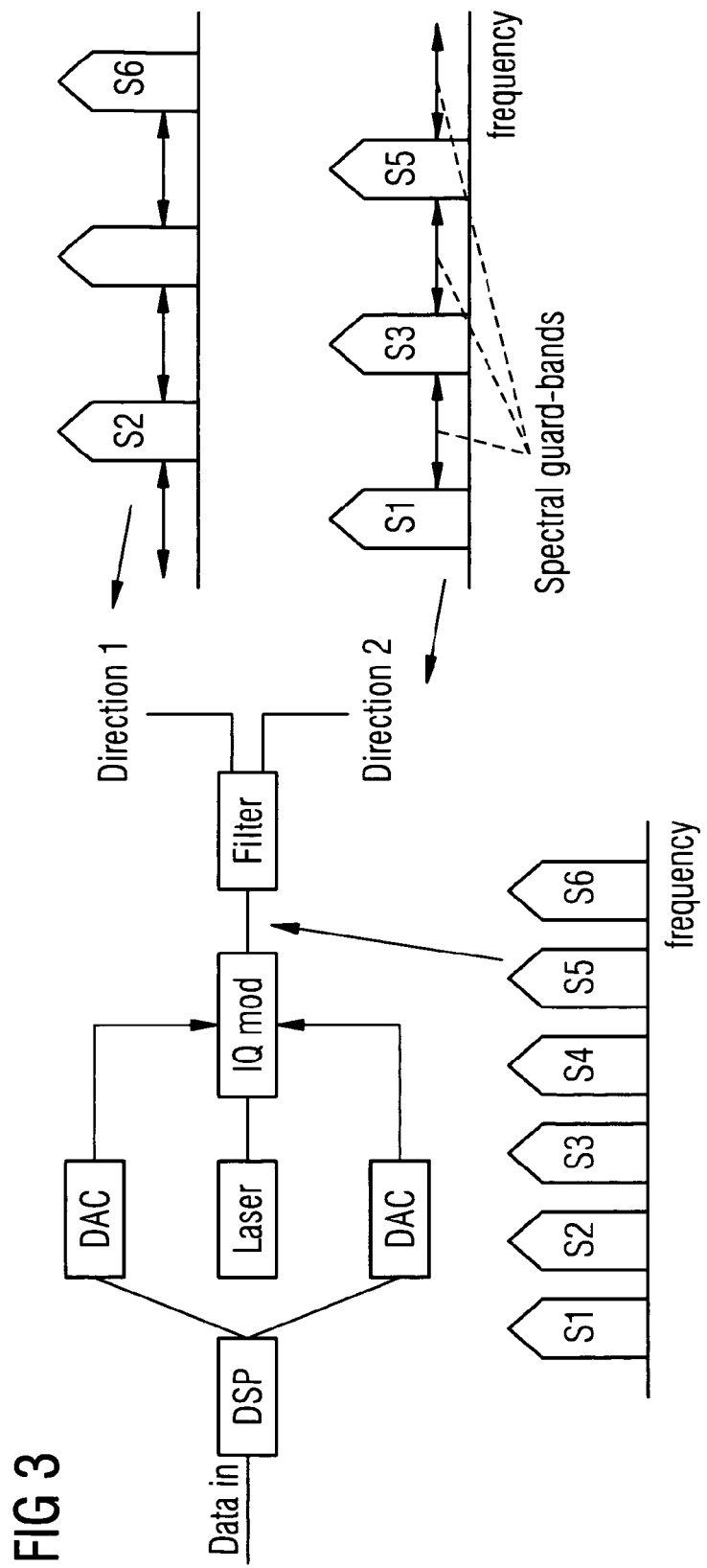
FIG. 3 is a schematic representation of possible DAC based realization of an OLT transmitter and the optical spectrum at the output according to an embodiment of the invention.

FIG. 3 is a schematic representation of possible DAC based realization of an OLT transmitter and the optical spectrum at the output according to an embodiment of the invention.

The data that is to be sent is first pre-processed by a DSP unit and digitally up-converted to intermediate frequencies. Subsequently the real and imaginary part are separated and fed to two DACs.

The outputs of the DACs are then used to modulate the complex signal on an optical carrier using an IQ modulator.

An optical periodic filter is used in conjunction to the IQ modulator in order to increase the usage of the DACs.

The optical periodic filter has two outputs (Direction 1 and Direction 2), each of them provides 3 WDM signals with the required guardbands. On the right side of FIG. 3 the optical spectrum of the transmitter output is shown. In this illustration 6 subcarriers are shown.

The main advantage of the proposed method is that the by adding the periodic filter to the output of the OLT, more signals can be generated per DAC. This effectively reduces the effective cost of the OLT per signal generated.

One challenge that arises is that the tunable laser must be tuned to the periodic filter.

This can be realized by fixing the filter and laser to a certain grid.

However, more cost effective might be to let the filter drift and lock the laser of the OLT to the periodic filter.

This allows the periodic filter to drift as the laser follows the filter.

The present invention is not limited to the details of the above described principles. The scope of the invention is defined by the appended claims and all changes and modifications as fall within the equivalents of the scope of the claims are therefore to be embraced by the invention. Mathematical conversions or equivalent calculations of the signal values based on the inventive method or the use of analogue signals instead of digital values are also incorporated.

LIST OF ABBREVIATIONS

ONU: Optical Network Unit
OLT: Optical Line Terminal
DAC: Digital Analog Converter

The invention claimed is:

1. An Optical Line Terminal (OLT) transmitting device comprising:
   an IQ modulator having a first input, a second input and an output;
   a first digital analog converter (DAC) directly coupled to the first input of the IQ modulator;
   a second digital analog converter (DAC) directly coupled to the second input of the IQ modulator;
   an optical filter directly coupled to the output of the IQ modulator, wherein the output of the IQ modulator provides a wavelength-division multiplexing (WDM) signal including a plurality of subcarriers which are not separated by guardbands wider than the bandwidth of the subcarriers,
   wherein the optical filter is a periodic filter, having two outputs each destined to serve a different transmission fiber, wherein the periodic filter is configured to provide different optical signals at each of the two outputs, and
   wherein each of the two outputs of the optical periodic filter provides a different wavelength-division multiplexing (WDM) signal including subcarriers separated by guardbands which are at least as wide as the bandwidth of the subcarriers.

2. The Optical Line Terminal (OLT) transmitting device of claim 1 wherein the IQ modulator has a third input, and wherein a tunable laser is directly coupled to the third input of the IQ modulator.

3. The Optical Line Terminal (OLT) transmitting device of claim 2, wherein the tunable laser is configured to be tuned with the optical filter.

4. The Optical Line Terminal (OLT) transmitting device of claim 2, wherein the optical filter is configured to drift to lock with the tunable laser.

5. A method of modulation in an Optical Line Terminal (OLT), comprising:
   generating an IQ modulated output signal based on a first digital-to-analog (DAC) converted signal and a second digital-to-analog (DAC) converted signal such as to provide a wavelength-division multiplexing (WDM) signal including a plurality of subcarriers which are not separated by guardbands wider than the bandwidth of the subcarriers; and
   filtering the generated IQ modulated output signal using a periodic optical filter having two outputs each destined to serve a different transmission fiber, such as to provide different optical signals at each of the two outputs of the periodic optical filter,
   wherein each of the two outputs of the optical periodic filter provides a different wavelength-division multiplexing (WDM) signal including subcarriers separated by guardbands which are at least as wide as the bandwidth of the subcarriers.

* * * * *